(12) United States Patent
Mishra et al.

(10) Patent No.: US 12,382,384 B2
(45) Date of Patent: *Aug. 5, 2025

(54) OpenRAN SOLUTION SUITE

(71) Applicant: Parallel Wireless, Inc., Nashua, NH (US)

(72) Inventors: Rajesh Kumar Mishra, Westford, MA (US); Kaitki Agarwal, Westford, MA (US); Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,505

(22) Filed: Feb. 20, 2024

(65) Prior Publication Data

US 2024/0284318 A1   Aug. 22, 2024

Related U.S. Application Data

(63) Continuation of application No. 17/203,740, filed on Mar. 16, 2021, now Pat. No. 11,910,303.

(60) Provisional application No. 62/990,307, filed on Mar. 16, 2020.

(51) Int. Cl.
| | |
|---|---|
| H04W 48/18 | (2009.01) |
| H04W 24/02 | (2009.01) |
| H04W 48/16 | (2009.01) |
| H04W 84/04 | (2009.01) |
| H04W 88/06 | (2009.01) |

(52) U.S. Cl.
CPC .......... *H04W 48/18* (2013.01); *H04W 24/02* (2013.01); *H04W 48/16* (2013.01); *H04W 84/042* (2013.01); *H04W 88/06* (2013.01)

(58) Field of Classification Search
CPC ..... H04W 48/18; H04W 24/02; H04W 48/16; H04W 84/042; H04W 88/06; H04B 1/0003
See application file for complete search history.

(56) References Cited

U.S. PATENT DOCUMENTS

| | | | |
|---|---|---|---|
| 9,113,352 B2 * | 8/2015 | Agarwal | H04W 24/02 |
| 9,867,418 B2 * | 1/2018 | Legg | A43B 3/0094 |
| 9,879,416 B2 * | 1/2018 | Spoo | E04B 1/7637 |
| 11,476,585 B1 * | 10/2022 | Abdelmonem | H01Q 21/26 |
| 11,910,303 B2 * | 2/2024 | Mishra | H04W 88/06 |
| 2018/0376338 A1 * | 12/2018 | Ashrafi | H04L 41/0816 |
| 2019/0149425 A1 * | 5/2019 | Larish | G06N 3/045 |
| | | | 706/16 |
| 2021/0289433 A1 * | 9/2021 | Mishra | H04W 48/18 |
| 2022/0225264 A1 * | 7/2022 | Song | H04W 92/12 |
| 2022/0264344 A1 * | 8/2022 | Wu | H04W 24/08 |

\* cited by examiner

*Primary Examiner* — Julio R Perez
(74) *Attorney, Agent, or Firm* — Michael Y. Saji

(57) ABSTRACT

Systems, methods and computer software are disclosed for providing an OpenRAN solution suite. In one embodiment, a method is disclosed, the method including communicating, by an all G COTS (Commercial off the Shelf) Base Band Unit (BBU), with a plurality of different G user devices; communicating, by a software platform, with the all G COTS BBU, wherein the software platform includes virtualized software providing open RAN controller functionality, network orchestrator functionality, and SON edge core functionality; and communicating, by the software platform, with a plurality of different G core networks.

20 Claims, 11 Drawing Sheets

OpenRAN SOLUTION SUITE

CROSS-REFERENCE TO RELATED APPLICATIONS

This application is a continuation of U.S. application Ser. No. 17/203,740, filed Mar. 16, 2021, which claims priority under 35 U.S.C. § 119(e) to U.S. Provisional Pat. App. No. 62/990,307, filed Mar. 16, 2020, titled "OpenRAN Solution Suite", each of which is hereby incorporated by reference in its entirety for all purposes. This application hereby incorporates by reference, for all purposes, each of the following U.S. patent application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1.

This application also hereby incorporates by reference U.S. Pat. No. 9,879,416, "Heterogeneous Mesh Network and Multi-RAT Node Used Therein," filed May 9, 2013; U.S. Pat. No. 9,113,352, "Heterogeneous Self-Organizing Network for Access and Backhaul," filed Sep. 12, 2013; U.S. Pat. No. 9,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 9, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes.

This document also hereby incorporates by reference U.S. Pat. Nos. 9,107,092, 9,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

This application also hereby incorporates by reference in their entirety each of the following U.S. Pat. applications or Pat. App. Publications: US20180242396A1 (PWS-72501US02); US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

OpenRAN is virtualized software running on "Open interface GPP-based hardware". There are different types of OpenRAN including integrated; hybrid (split 6); and split 7, 9.

5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

SUMMARY

A system is disclosed to provide an OpenRAN solution suite. The OpenRAN solution suite includes a software platform in communication with an all G COTS BBU, the all G COTS BBU in communication with a plurality of different G user devices, wherein the software platform includes virtualized software providing open RAN controller functionality, network orchestrator functionality, and SON edge core functionality; and a plurality of different G core networks in communication with the software platform.

In another example embodiment, a method for providing an OpenRAN software suite includes communicating, by a software platform, with an all G COTS BBU, the all G COTS BBU in communication with a plurality of different G user devices, wherein the software platform includes virtualized software providing open RAN controller functionality, network orchestrator functionality, and SON edge core functionality; and communicating, by the software platform, with a plurality of different G core networks.

In another embodiment a non-transitory computer-readable medium contains instructions for providing an OpenRAN software suite. The computer readable medium includes instructions for communicating, by a software platform, with an all G COTS BBU, the all G COTS BBU in communication with a plurality of different G user devices, wherein the software platform includes virtualized software providing open RAN controller functionality, network orchestrator functionality, and SON edge core functionality; and instructions for communicating, by the software platform, with a plurality of different G core networks.

DETAILED DESCRIPTION

Figure 1:
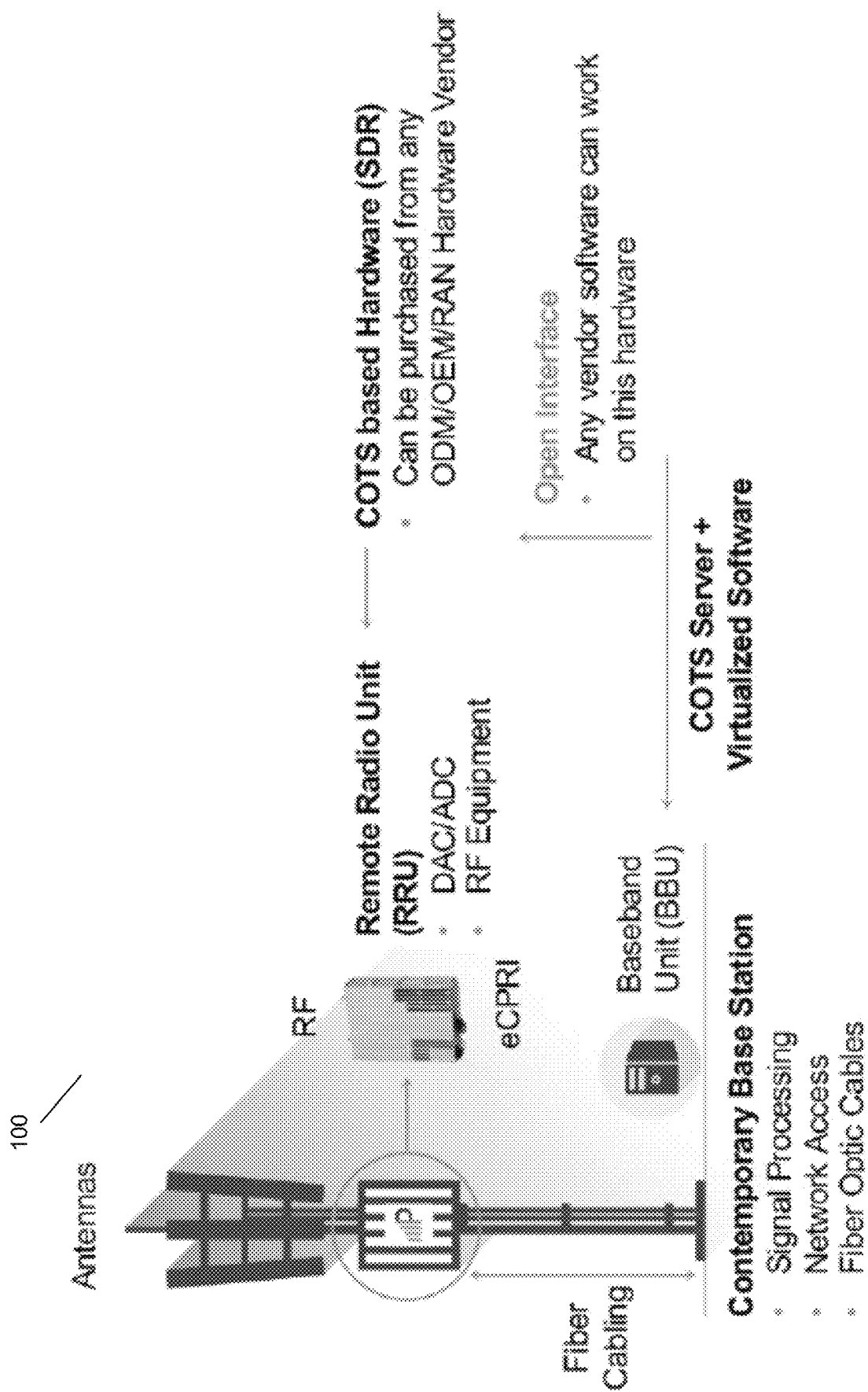
FIG. 1 is a system diagram showing OpenRAN hardware and software, in accordance with some embodiments.

FIG. 1 is a diagram of an OpenRAN system 100. The system includes a contemporary base station including signal processing, network access and fiber optic cables, a remote radio unit (RRU) including a DAC and ADC and RF equipment. The system also includes a COTS server and virtualized software.

Figure 2:
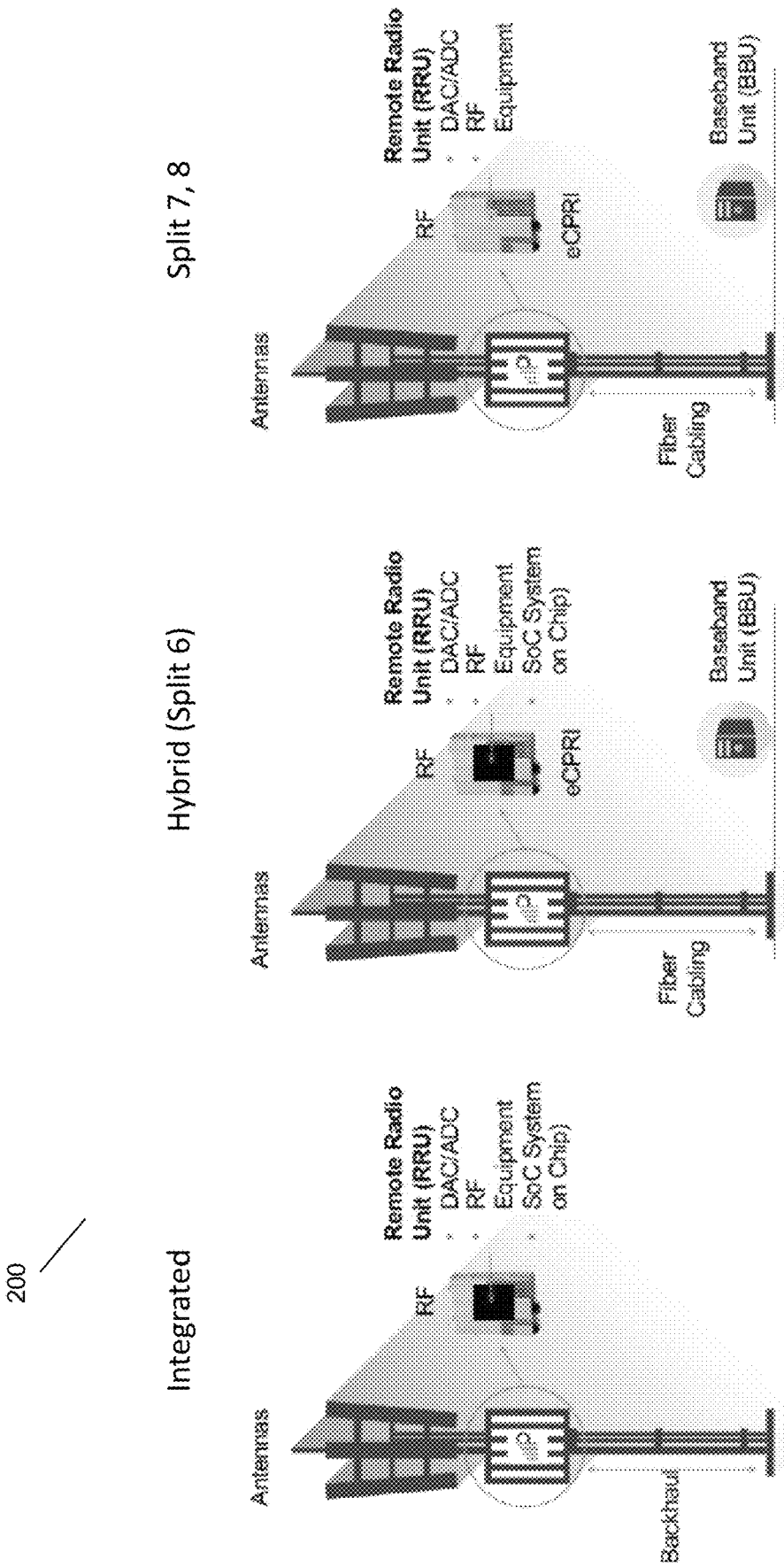
FIG. 2 is a system diagram showing different types of OpenRAN, in accordance with some embodiments.

FIG. 2 shows different types of OpenRAN 200. These different types include integrated; hybrid (split 6); and split 7, 9. Integrated OpenRAN includes Ultra and Ultra/Ultra rural. This includes 2G, 3G and 4G from a same base station and is software upgradeable to 5G. Integrated OpenRAN featured the lowest power consumption for multi-mode operation.

The Hybrid (split 6) is used in rural and suburban environments. This includes all G from a same base station and is software upgradeable to 5G. A COTS server can be added for vBBU to increase user count and add throughput. This is also upgradeable to other splits.

The split 7,8 OpenRan is used in urban, suburban and rural environments. This includes all G from a same base station and is software upgradeable to 5G. This is useful in urban and suburban scenarios. This features a pooled server capacity with a COTS BBU. This is also upgradeable to other splits.

Figure 3:
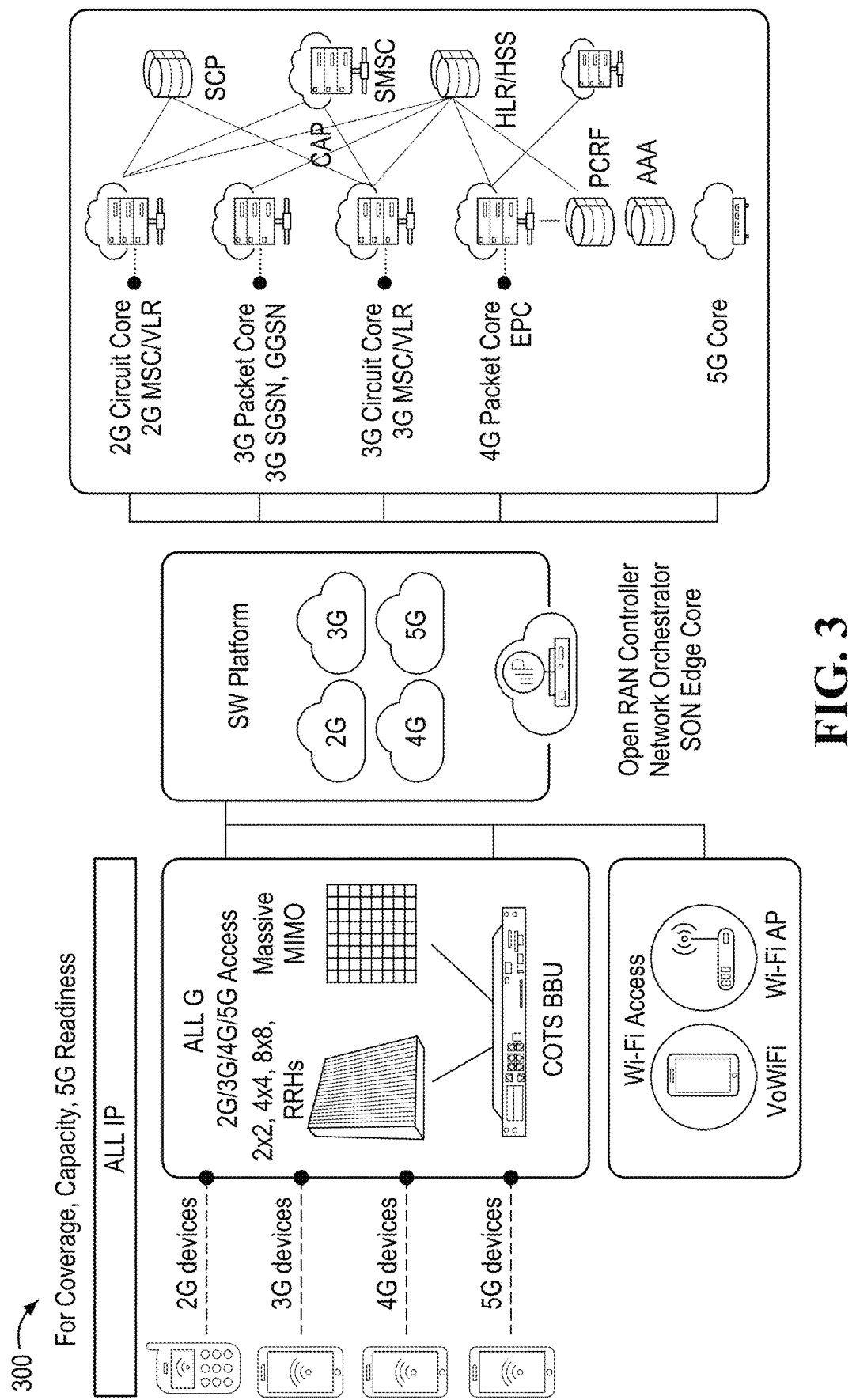
FIG. 3 is a system diagram showing coverage, capacity and 5G readiness, in accordance with some embodiments.

FIG. 3 shows an OpenRAN solution suite 300 which is useful for coverage, capacity and 5G readiness. It includes 2G, 3G, 4G and 5G devices in communication with an all G COTS BBU. The COTS BBU is in communication with a software platform including an open RAN controller, a network orchestrator and a SON edge core. WiFi access devices are also in communication with the software platform. The software platform is in communication with a 2G circuit core, a 3G packet core, a 3G circuit core, a 4G packet core and a 5G core.

Figure 4:
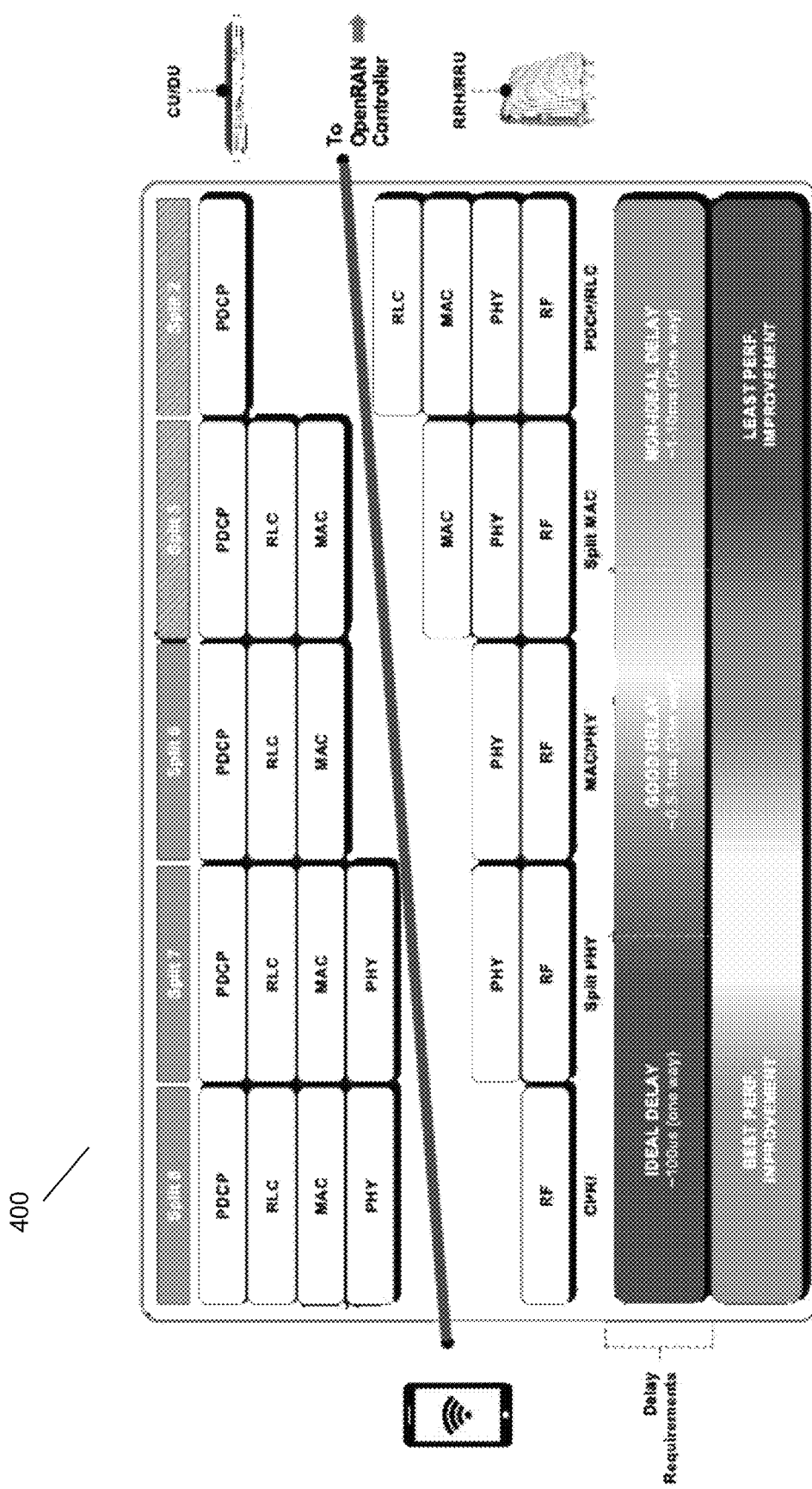
FIG. 4 is a diagram showing RAN splits, in accordance with some embodiments.

FIG. 4 shows the RAN splits 400 and associated performance. For hybrid split 6, any vendor with a standard PHY interface and standard RF can be connected to a CU. This helps provide faster time to market and additional capacity to an existing site. This is cost-effective for low-density areas and is future proofed.

Split 7 is more applicable for dense urban areas and is 3GPP compliant. RF and PHY are kept at RRUs. This is a flexible architecture making deployment of a 4G solution easy and seamless. Deployment may be based on morphology and availability of fronthaul and can adapt to necessary resources.

Split 9 is 3GPP compliant. The baseband resources are centrally pooled. The RF and PHY are decoupled. This allows to scale the network to accommodate many sectors, multiple channel bandwidths and massive MIMO operation. This also provides interference mitigation, coverage expansion, joint transmission and reception supporting a large UE count in both UL and DL. The software-centric and commodity hardware reduces cost further, providing lowest TCO.

Figure 5:
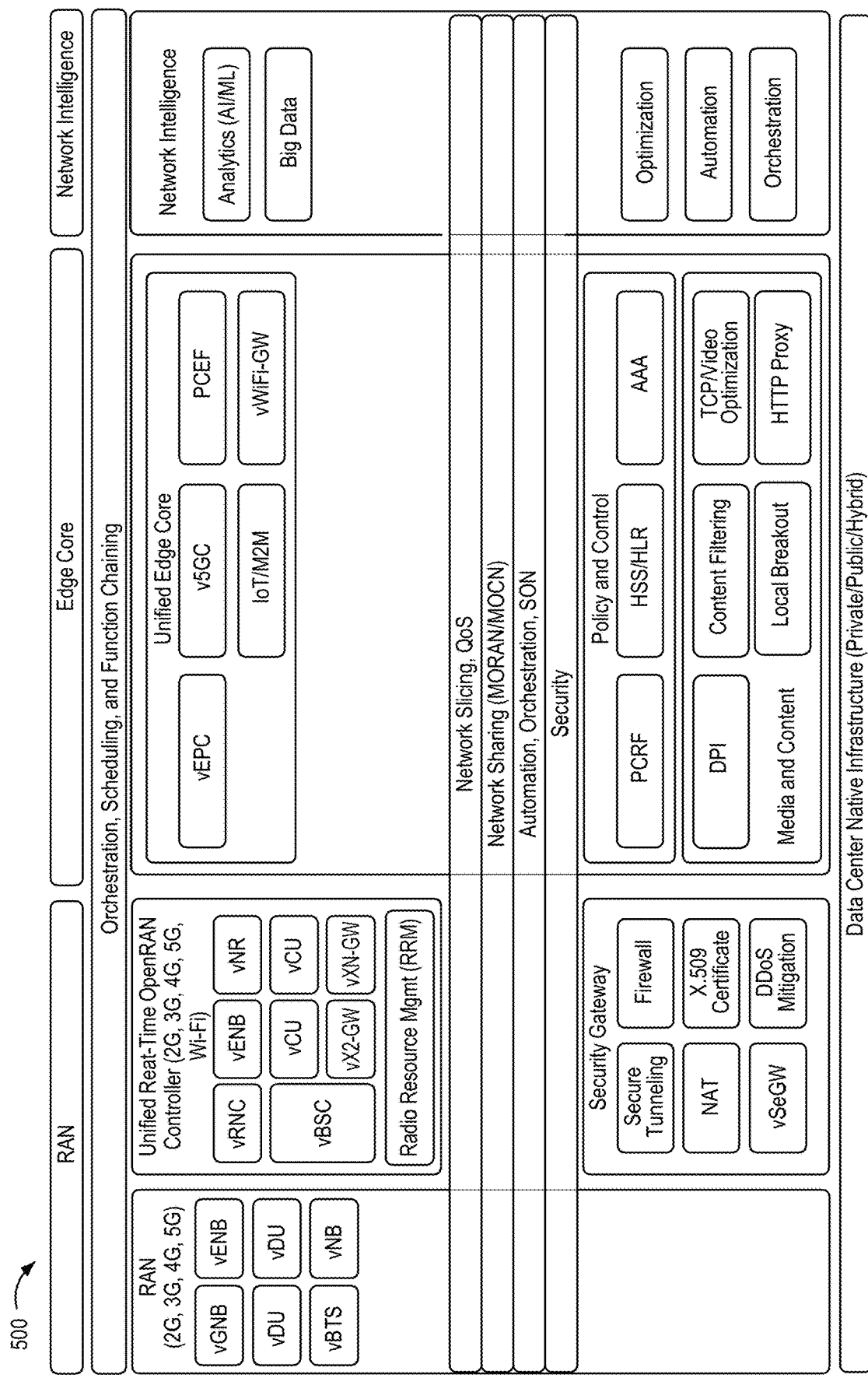
FIG. 5 is a system diagram showing core OpenRAN technical components, in accordance with some embodiments.

FIG. 5 shows the unified OpenRAN and network software suite technical components 500. The network software suite technical components are unified across all G: 2G, 3G, and WiFi in addition to 4G and 5G. this provides automation for hands free maintenance and enables largest RAN hardware ecosystem. Unified improved user experience across technologies. Provides support of various coverage, capacity, densification, and neutral hosting use cases. Largest hardware ecosystem. Utilizes software defined radios for 2G, 3G, 4G and 5G. software upgradeable to any G. Easy to install and maintain.

Rural networks challenges and solutions. Deployment costs for low density/low ARPU include: license and permits; equipment costs, RAN, backhaul and power solutions; site planning and design. Site construction and materials tower/pole, fencing, civil and installation works; logistics including shipment, customs/clearance, local warehousing and insurance. The OpenRAN solution suite is easy and fast to deploy.

Opex: NOC and management services; backhaul; electricity; battery amortization and annual support and other permits. The OpenRAN solution suite is easy to maintain/automation.

Future proof: coverage issues may become capacity issues; battery backhaul might become available; future technologies. The OpenRAN solution suite is software upgradeable.

End user experience: rural users are expecting same experience in rural as in urban; roamers, emergency services. The OpenRAN solution suite provides quality coverage everywhere.

Urban networks challenges and solutions. Deployment costs: zoning and permits for new sites; extending life of macro with offload; WiFi integration; indoor coverage, massive MIMO costs, cost to upgrade power and backhaul infrastructure for densification and massive MIMO; cost to maintain QoS and increasing numbers of users. The OpenRAN solution suite is easy to install and provides self-configuration of many cells.

Opex: NOC and management services; time and getting access to sites; resource efficiency with targeted capacity;

cost of adding capacity to sites. The OpenRAN solution suite provides network automation for hands-free maintenance.

Future proof: new services can be added (IoT); 5G, 6G, 7G etc. The OpenRAN solution suite is software upgradeable to any G, COTS BBU can support any vendor/any G.

End user experience: network overloads in high peak hours cause poor experience; IoT services requiring ubiquitous coverage. The OpenRAN solution suite provides seamless mobility QoS for all G slicing for all G.

Drivers for urban and hyperdense deployments. Capacity includes consumer driven capacity demands; filing holes in capacity; and scalable capacity.

New revenue and end user experience include new applications and revenues; support of new customers; IoT services requiring ubiquitous coverage and enable SLA based services.

Needs for capacity 4G/5G include rural capacity; speed and high throughput experience and seamless mobility and roaming; urban capacity, IoT use cases, and quality and consistent experience everywhere.

High density scenarios are easy to deploy, manage and scale: self-configuration makes radios plug-and-play; self-optimization reduces the need for drive testing; software-defined RRUs to upgrade user count and technologies, so sites can be software upgradeable to higher capacity with COTS BBU or 5G when needed.

Meeting growing performance expectations for every customer and environment. High throughput delivered consistently with scalable BBU capacity; network slicing for differentiated experiences; and edge intelligence for temporary capacity increase when needed.

Software platform enables 5G-native architecture, upgradeable to any 3GPP, enable and 5G migration option; 5G OpenRAN ecosystem of hardware, DU; 4G and 5G CU software and controller; and edge core and controller software enable flexibility to introduce new components and services within the network.

City: macros and small cells. A dense city center deployment delivers mobile broadband and infotainment services to customers using public transport. 3-secotr configuration, sharing 1 vBBU server with pooled capacity for throughput.

Network slicing and core sharing. Intelligent routing: RTP localization with controller/edge; core assistance; signaling load reduction towards core; SON to manage interference and enterprise Aps; and edge intelligence and enterprise specific services (IoT, MCE).

uRLLC—migration strategy—with 5G native architecture MNOs can select any migration option based on their timelines and budget. For SA (standalone): option 1—SA LTE connected to EPC; option 2—SA NR connected to 5GC; option 5—SA LTE connected to 5GC. For NSA (non-standalone): option 3 NSA LTE assisted NR connected to EPC; option 4—NSA NR assisted LTE connected to 5GC; option 7—NSA LTE assisted to NR connected to 5GC.

URLLC network building blocks. An OpenRAN controller can be deployed at edge of the network with intelligent SON with edge computing abilities. Data breakout closer to the radio; co-locate EPC data breakout with OpenRAN controller and CU; flexibility to locate data breakout at any Edge location; control plane can be located in Centralized Data Center; single control plane handling multiple distributed edge data locations; support for URLLC QCIs; and ultra-low latency in milliseconds.

Compatible with edge compute. MEC: intelligence to the edge is where the world is going. Key tenet for successful 5G deployments. MNO/Fixed/WiFi. Concrete use cases of FMC are becoming reality. Next frontier for innovation. Solution is compliant with ETSIs MEC specifications, and implements intelligence to the edge.

Figure 6:
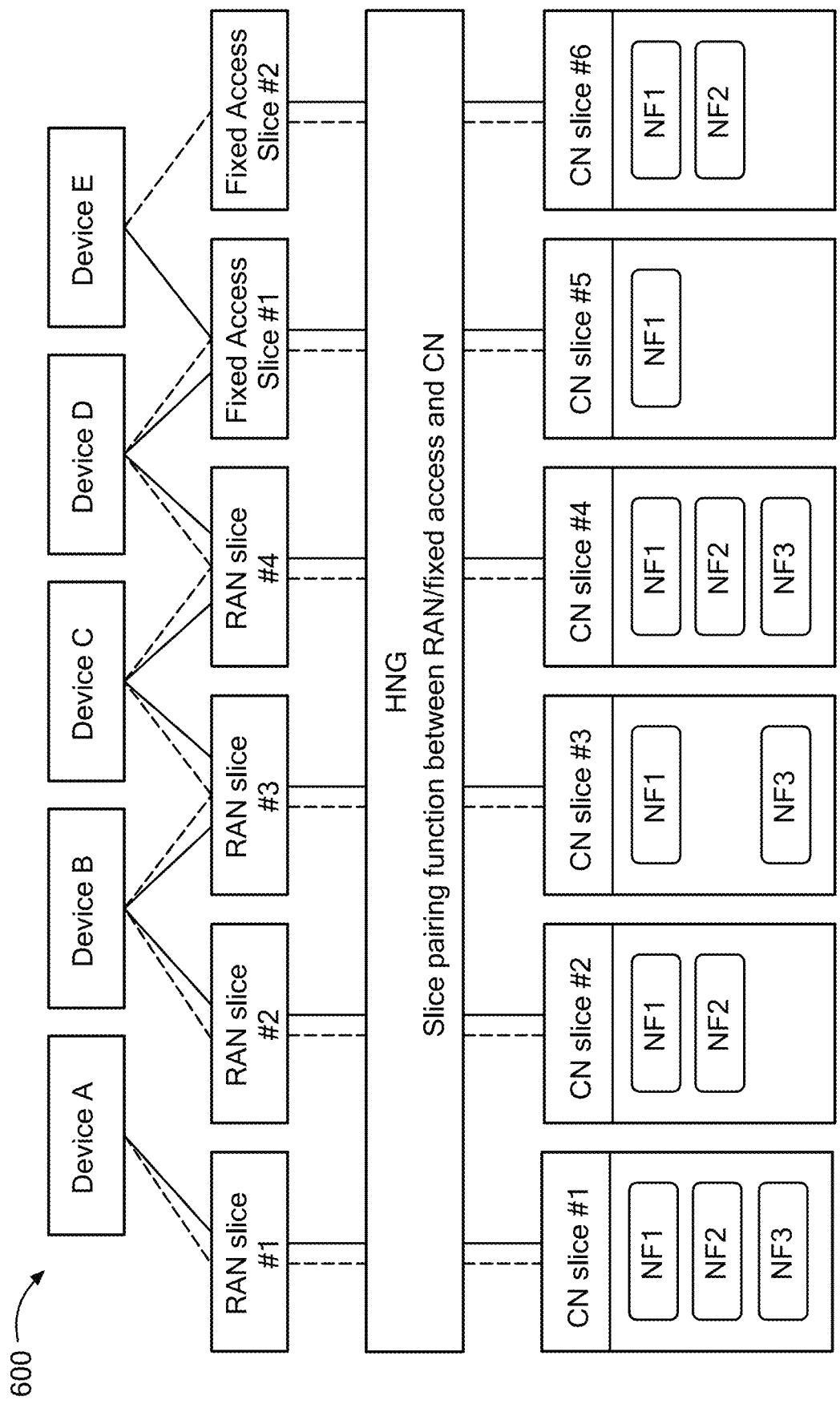
FIG. 6 is a diagram showing network slicing, in accordance with some embodiments.

FIG. 6 shows a system 600 implementing network slicing. End-to-end across all devices, RAN and core.

5G NR radio access network. Basic architecture: the gNB functionality could be realized via CU and DU in option 2 split mode. CU implements the upper layers PDCP, RRC and RRM. DU implements the lower layers RLC MAC and PHY. Xn interface connecting gNBs directly to support active-mode mobility and DC functionalities. The CU along with RAN controller realizes a unified RRM which benefits form multi cell aggregation for optimized resource management. Standard Fs interface for connecting gNB-CU and gNB-DU. General guidance RRC, SDAP and PDCP reside in gNB-CU and remaining protocol entities (RLC, MAC and PHY) in gNB-DU.

Figure 7:
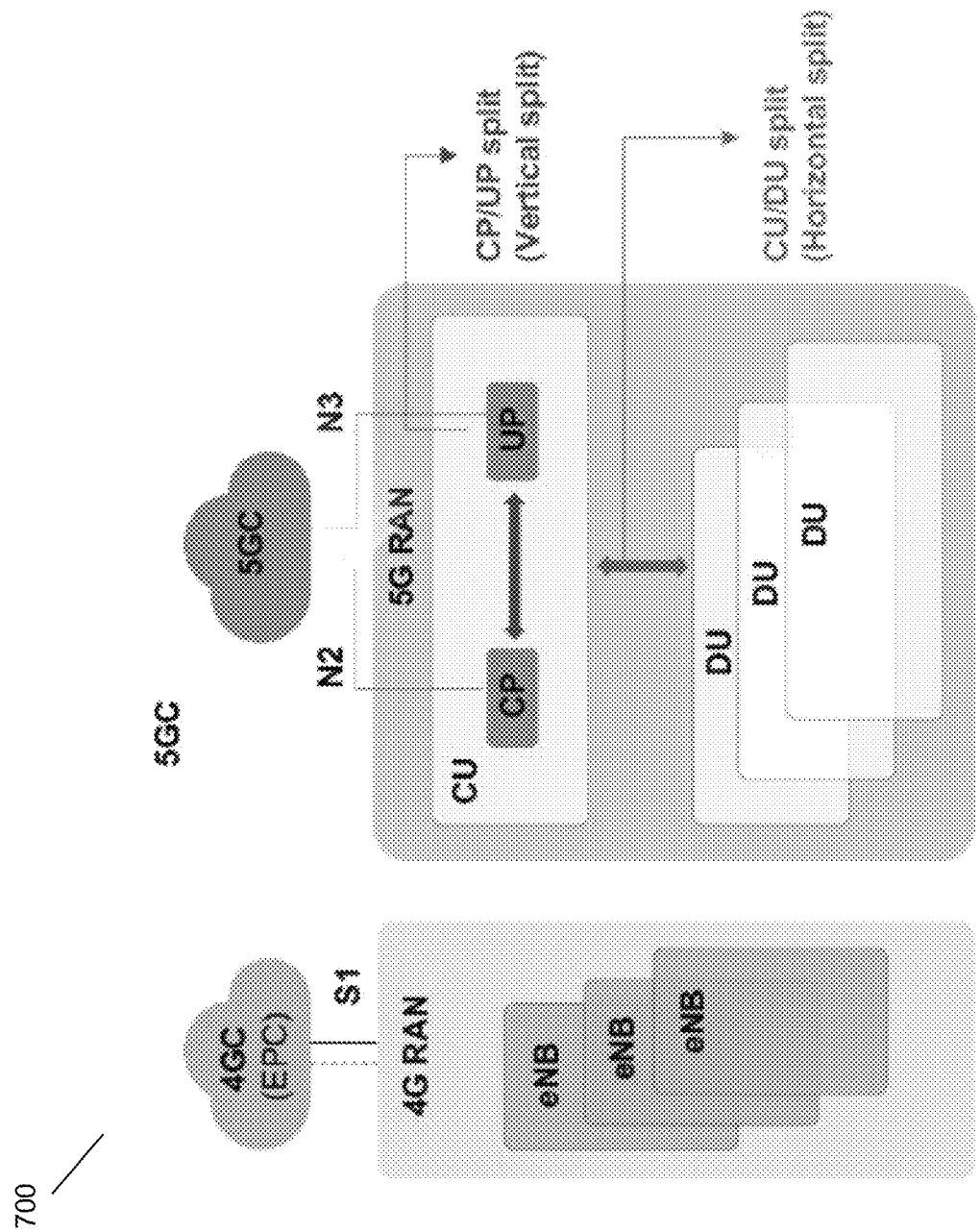
FIG. 7 is a diagram showing 5G RAN functional splits, in accordance with some embodiments.

FIG. 7 shows 5G RAN functional splits 700. Control Plane/User split (vertical split). First step for introduction of SDN in the RAN. Allows separate optimization of CP and UP. Consistent CP in multi-vendor networks. More challenges for lower layer splits.

Central Unit/Distributed Unit split (horizontal split). Obtain centralization gain, both in terms of performance gains and economy of scale. Shift functionalities to different locations base don morphologies and transport availabilities. Make overall RAN more future proof and less costly for future generation upgrades.

Figure 8:
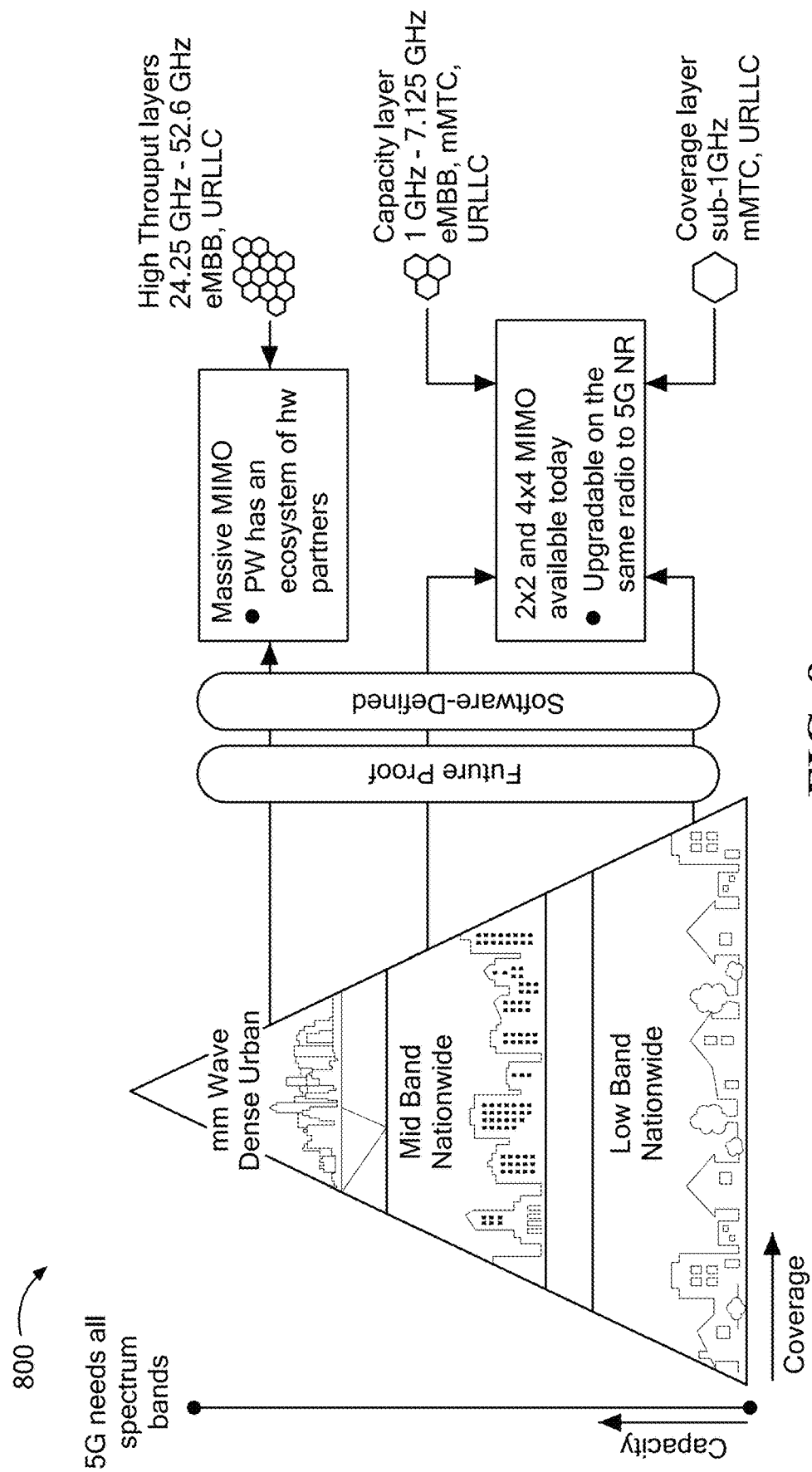
FIG. 8 is a diagram showing 5G spectrum bands and OpenRAN, in accordance with some embodiments.

FIG. 8 is a diagram showing 5G spectrum bands and OpenRAN 800.

Figure 9:
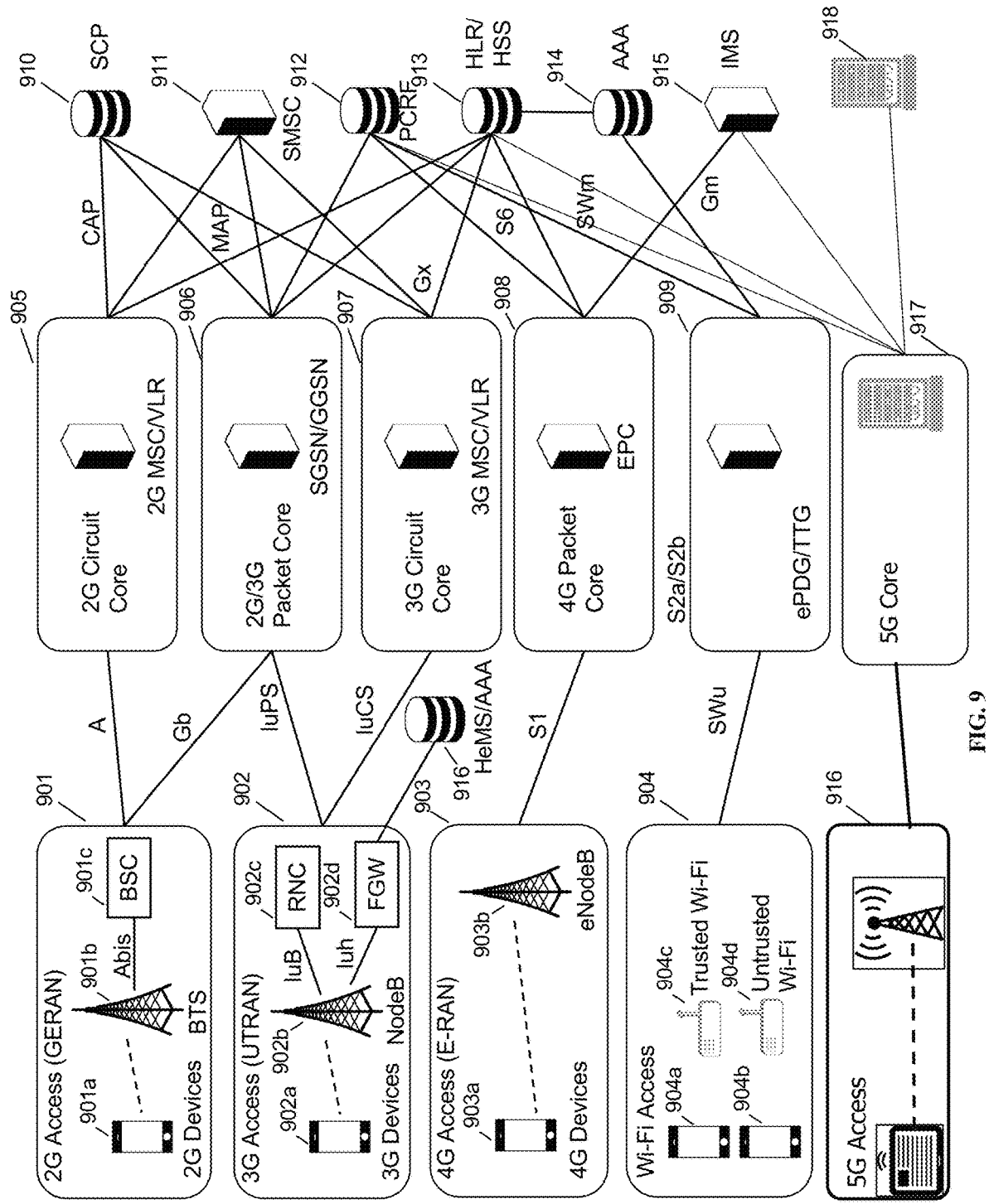
FIG. 9 is a schematic network architecture diagram for 3G and other-G networks.

FIG. 9 is a schematic network architecture diagram for 3G and other-G prior art networks. The diagram shows a plurality of "Gs," including 2G, 3G, 4G, 5G and Wi-Fi. 2G is represented by GERAN 901, which includes a 2G device 901*a*, BTS 901*b*, and BSC 901*c*. 3G is represented by UTRAN 902, which includes a 3G UE 902*a*, nodeB 902*b*, RNC 902*c*, and femto gateway (FGW, which in 3GPP namespace is also known as a Home nodeB Gateway or HNBGW) 902*d*. 4G is represented by EUTRAN or E-RAN 903, which includes an LTE UE 903*a* and LTE eNodeB 903*b*. Wi-Fi is represented by Wi-Fi access network 904, which includes a trusted Wi-Fi access point 904*c* and an untrusted Wi-Fi access point 904*d*. The Wi-Fi devices 904*a* and 904*b* may access either AP 904*c* or 904*d*. In the current network architecture, each "G" has a core network. 2G circuit core network 905 includes a 2G MSC/VLR; 2G/3G packet core network 906 includes an SGSN/GGSN (for EDGE or UMTS packet traffic); 3G circuit core 907 includes a 3G MSC/VLR; 4G circuit core 908 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 930, the SMSC 931, PCRF 932, HLR/HSS 933, Authentication, Authorization, and Accounting server (AAA) 934, and IP Multimedia Subsystem (IMS) 935. An HeMS/AAA 936 is present in some cases for use by the 3G UTRAN. The diagram is used to indicate schematically the basic functions of each network as known to one of skill in the art, and is not intended to be exhaustive. For example, 5G core 917 is shown using a single interface to 5G access 916, although in some cases 5G access can be supported using dual connectivity or via a non-standalone deployment architecture.

Noteworthy is that the RANs 901, 902, 903, 904 and 936 rely on specialized core networks 905, 906, 907, 908, 909, 937 but share essential management databases 930, 931, 932, 933, 934, 935, 938. More specifically, for the 2G GERAN, a BSC 901*c* is required for Abis compatibility with BTS 901*b*, while for the 3G UTRAN, an RNC 902*c* is required for Iub compatibility and an FGW 902*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 10:
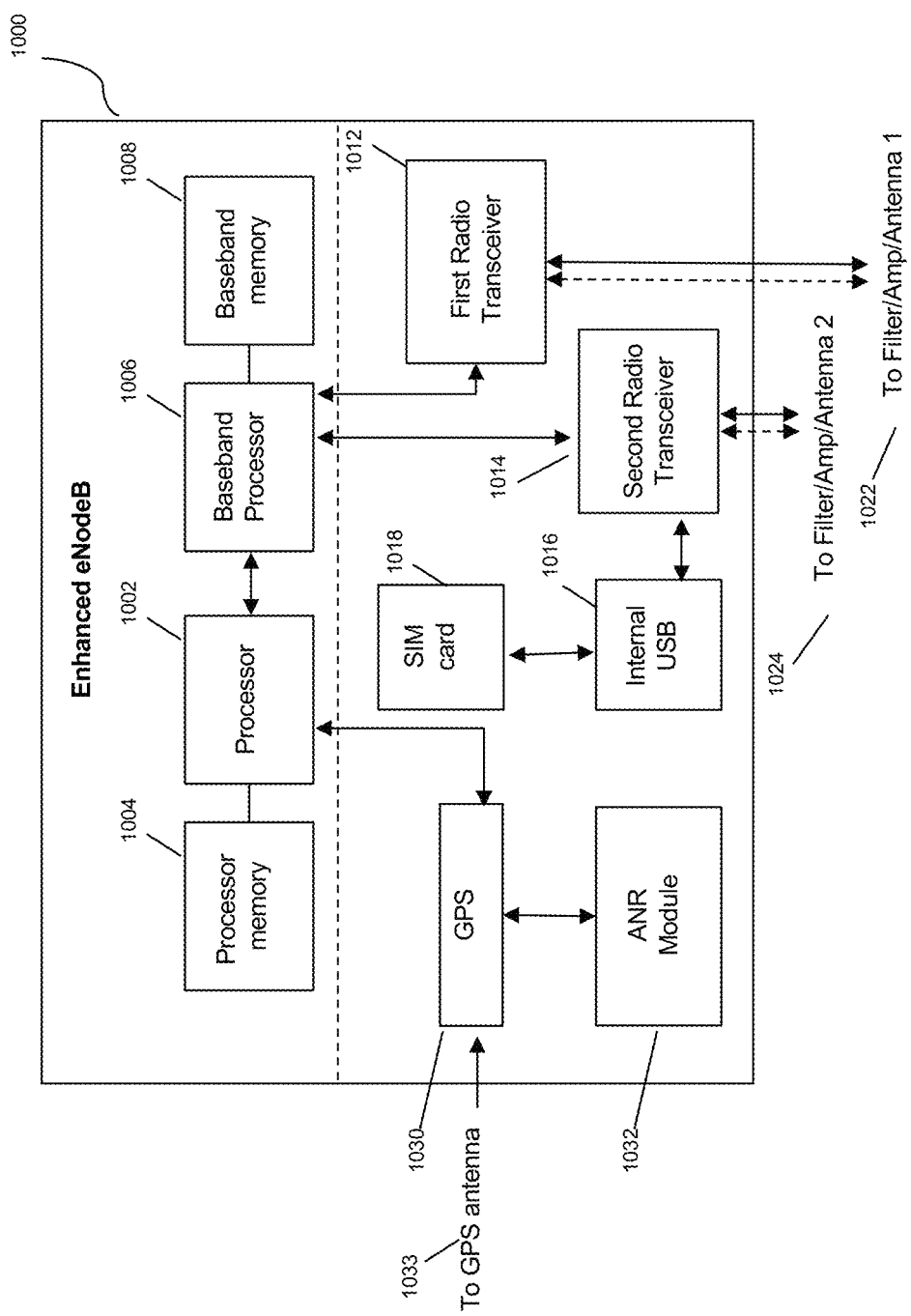
FIG. 10 is an enhanced eNodeB for performing the methods described herein, in accordance with some embodiments.

FIG. 10 is an enhanced base station for performing the methods described herein, in accordance with some embodiments. Base station 1000 may include processor 1002, processor memory 1004 in communication with the processor, baseband processor 1006, and baseband processor memory 1008 in communication with the baseband processor. Mesh network node 1000 may also include first radio transceiver 1012 and second radio transceiver 1014, internal universal serial bus (USB) port 1016, and subscriber information module card (SIM card) 1018 coupled to USB port 1016. In some embodiments, the second radio transceiver 1014 itself may be coupled to USB port 1016, and communications from the baseband processor may be passed through USB port 1016. The second radio transceiver may be used for wirelessly backhauling eNodeB 1000.

Processor 1002 and baseband processor 1006 are in communication with one another. Processor 1002 may perform routing functions, and may determine if/when a switch in network configuration is needed. Baseband processor 1006 may generate and receive radio signals for both radio transceivers 1012 and 1014, based on instructions from processor 1002. In some embodiments, processors 1002 and 1006 may be on the same physical logic board. In other embodiments, they may be on separate logic boards.

Processor 1002 may identify the appropriate network configuration, and may perform routing of packets from one network interface to another accordingly. Processor 1002 may use memory 1004, in particular to store a routing table to be used for routing packets. Baseband processor 1006 may perform operations to generate the radio frequency signals for transmission or retransmission by both transceivers 1010 and 1012. Baseband processor 1006 may also perform operations to decode signals received by transceivers 1012 and 1014. Baseband processor 1006 may use memory 1008 to perform these tasks.

The first radio transceiver 1012 may be a radio transceiver capable of providing LTE eNodeB functionality, and may be capable of higher power and multi-channel OFDMA. The second radio transceiver 1014 may be a radio transceiver capable of providing LTE UE functionality. Both transceivers 1012 and 1014 may be capable of receiving and transmitting on one or more LTE bands. In some embodiments, either or both of transceivers 1012 and 1014 may be capable of providing both LTE eNodeB and LTE UE functionality. Transceiver 1012 may be coupled to processor 1002 via a Peripheral Component Interconnect-Express (PCI-E) bus, and/or via a daughtercard. As transceiver 1014 is for providing LTE UE functionality, in effect emulating a user equipment, it may be connected via the same or different PCI-E bus, or by a USB bus, and may also be coupled to SIM card 1018. First transceiver 1012 may be coupled to first radio frequency (RF) chain (filter, amplifier, antenna) 1022, and second transceiver 1014 may be coupled to second RF chain (filter, amplifier, antenna) 1024.

SIM card 1018 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1000 is not an ordinary UE but instead is a special UE for providing backhaul to device 1000.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1012 and 1014, which may be 3G, 4G, 5G, Wi-Fi 1002.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1002 for reconfiguration.

A GPS module 1030 may also be included, and may be in communication with a GPS antenna 1032 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1032 may also be present and may run on processor 1002 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 11:
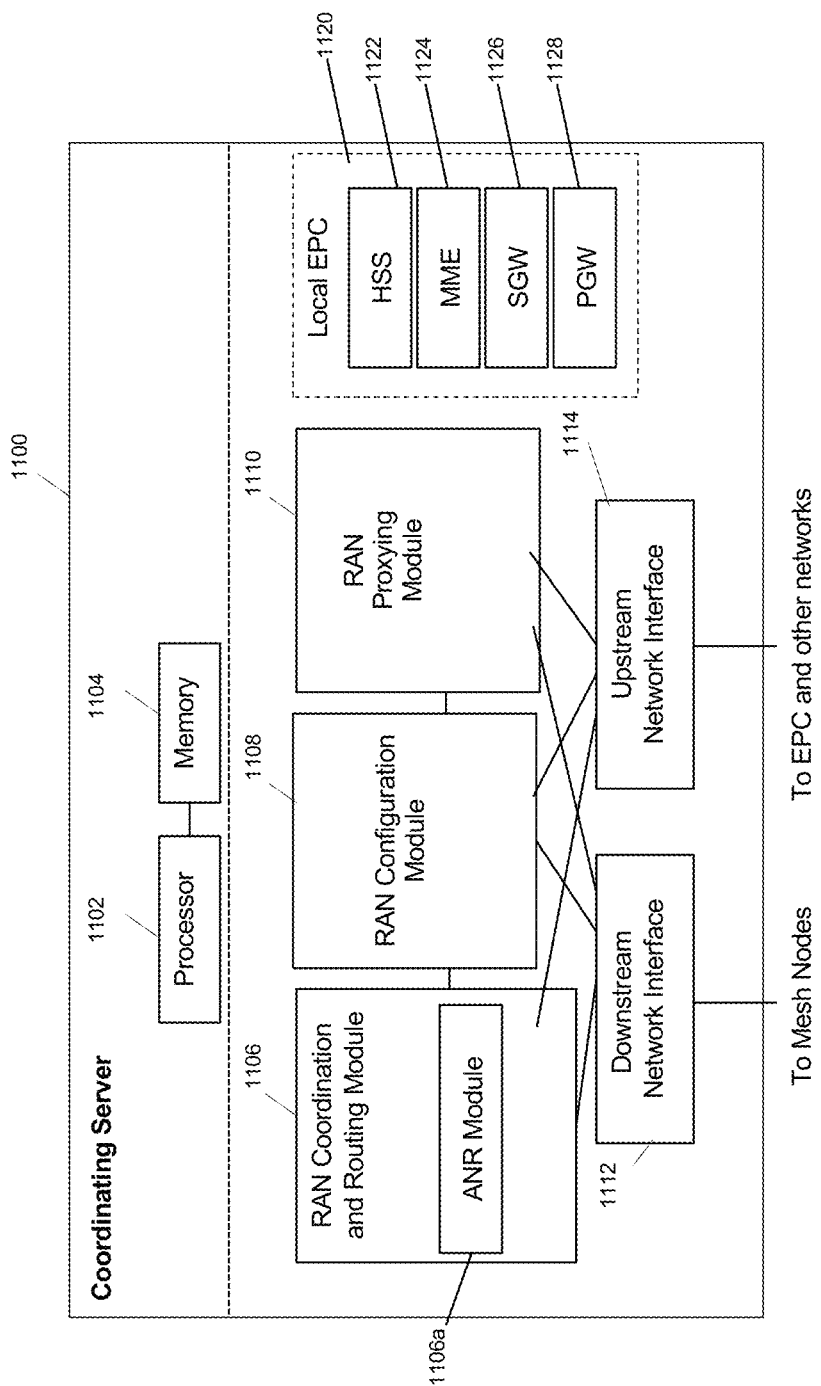
FIG. 11 is a coordinating server for providing services and performing methods as described herein, in accordance with some embodiments.

FIG. 11 is a coordinating server for providing services and performing methods as described herein, in accordance with some embodiments. Coordinating server 1000 includes processor 1002 and memory 1104, which are configured to provide the functions described herein. Also present are radio access network coordination/routing (RAN Coordination and routing) module 1106, including ANR module 1106*a*, RAN configuration module 1108, and RAN proxying module 1110. The ANR module 1106*a* may perform the ANR tracking, PCI disambiguation, ECGI requesting, and GPS coalescing and tracking as described herein, in coordination with RAN coordination module 1106 (e.g., for requesting ECGIs, etc.). In some embodiments, coordinating server 1100 may coordinate multiple RANs using coordination module 1106. In some embodiments, coordination server may also provide proxying, routing virtualization and RAN virtualization, via modules 1110 and 1108. In some embodiments, a downstream network interface 1112 is provided for interfacing with the RANs, which may be a radio interface (e.g., LTE), and an upstream network interface 1114 is provided for interfacing with the core network, which may be either a radio interface (e.g., LTE) or a wired interface (e.g., Ethernet).

Coordinator 1100 includes local evolved packet core (EPC) module 1120, for authenticating users, storing and caching priority profile information, and performing other EPC-dependent functions when no backhaul link is available. Local EPC 1120 may include local HSS 1122, local MME 1124, local SGW 1126, and local PGW 1128, as well as other modules. Local EPC 1120 may incorporate these modules as software modules, processes, or containers. Local EPC 1120 may alternatively incorporate these modules as a small number of monolithic software processes. Modules 1106, 1108, 1110 and local EPC 1120 may each run on processor 1102 or on another processor, or may be located within another device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 902.11a/b/g/n/ac/ad/af/ah. In some embodiments, the base stations described herein may support 902.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 902.11a/b/g/n/ac/af/p/h. In some embodiments, the base stations described herein may support IEEE 902.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method of providing an Open Radio Access Network (OpenRAN) solution suite, comprising:
    providing, at a baseband unit (BBU) virtualization software platform, pooled BBU server capacity via at least two of a virtual eNodeB (vENB) baseband function, a virtual gNodeB (vGNB) baseband function, and a virtual base transceiver station (vBTS), the BBU virtualization software platform facilitating radio access via a radio transceiver to a plurality of different G user devices; and
    providing, across the BBU virtualization software platform and an edge core functionality, virtualized software providing network orchestrator functionality, automation functionality, and self-organizing network (SON) edge core functionality
    for a plurality of different G core networks,
    thereby providing automation across at least two of 2G, 4G, and 5G radios.

2. The method of claim 1 wherein the OpenRAN comprises at least one of integrated OpenRAN, hybrid OpenRAN, and Split 7 OpenRAN.

3. The method of claim 1 further comprising communicating with at least one of a 2G user device, a 4G user device and a 5G user device.

4. The method of claim 1 further comprising communicating, by the BBU virtualization software platform, with a Wi-Fi access device.

5. The method of claim 2 further comprising using the hybrid open RAN in rural and suburban environments and includes all G from a same base station and is software upgradeable to 5G.

6. The method of claim 2 further comprising using the split 7,8 OpenRan in urban, suburban and rural environments and includes all G from a same base station and is software upgradeable to 5G.

7. The method of claim 6 further comprising providing a pooled server capacity with a BBU.

8. A system for providing an Open Radio Access Network (OpenRAN) solution suite, comprising:
a baseband unit (BBU) virtualization software platform providing pooled BBU server capacity in communication with an all G baseband unit (BBU), the all G BBU in communication with a plurality of different G user devices, wherein the software platform includes virtualized software providing open RAN controller functionality, network orchestrator functionality, and SON edge core functionality, and wherein the software platform provides automation across at least two of 2G, 4G, and 5G radios; and
an orchestration, scheduling, and automation virtualization software platform in communication with the BBU virtualization software platform and a plurality of core networks.

9. The system of claim 8 wherein the OpenRAN comprises at least one of integrated OpenRAN, hybrid OpenRAN, and Split 7 OpenRAN.

10. The system of claim 8 wherein the plurality of different G user devices includes at least one of a 2G user device, a 4G user device and a 5G user device.

11. The system of claim 8 further comprising a Wi-Fi access device in communication with the BBU virtualization software platform.

12. The system of claim 9 further comprising using the hybrid open RAN in rural and suburban environments and includes all G from a same base station and is software upgradeable to 5G.

13. The system of claim 9 further comprising using the split 7,8 OpenRan in urban, suburban and rural environments and includes all G from a same base station and is software upgradeable to 5G.

14. The system of claim 13 further comprising a pooled server capacity with a BBU.

15. A non-transitory computer-readable media containing instructions for providing an Open Radio Access Network (OpenRAN) solution suite which, when executed, causes steps to be performed comprising:
providing, at a baseband unit (BBU) virtualization software platform, pooled BBU server capacity via at least two of a virtual eNodeB (vENB) baseband function, a virtual gNodeB (vGNB) baseband function, and a virtual base transceiver station (vBTS), the BBU virtualization software platform facilitating radio access via a radio transceiver to a plurality of different G user devices; and
providing, across the BBU virtualization software platform and an edge core functionality, virtualized software providing network orchestrator functionality, automation functionality, and self-organizing network (SON) edge core functionality for a plurality of different G core networks,
thereby providing automation across at least two of 2G, 4G, and 5G radios.

16. The computer-readable media of claim 15 further including instructions wherein the OpenRAN comprises at least one of integrated OpenRAN, hybrid OpenRAN, and Split 7 OpenRAN.

17. The computer-readable media of claim 15 wherein communicating with a plurality of different G user devices includes communicating with at least one of a 2G user device, a 3G user device, a 4G user device and a 5G user device.

18. The computer-readable media of claim 15 further comprising communicating, by the software platform, with a WiFi access device.

19. The computer-readable media of claim 16 further comprising using the hybrid open RAN in rural and suburban environments and includes all G from a same base station and is software upgradeable to 5G.

20. The computer-readable media of claim 16 further comprising using the split 7,8 OpenRan in urban, suburban and rural environments and includes all G from a same base station and is software upgradeable to 5G.

* * * * *